(No Model.)
P. A. EICHLER.
REGISTER FOR BILLIARD TABLES.
No. 456,693. Patented July 28, 1891.
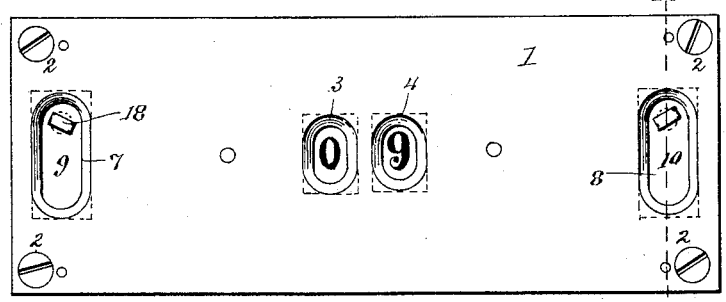
Fig. 1.
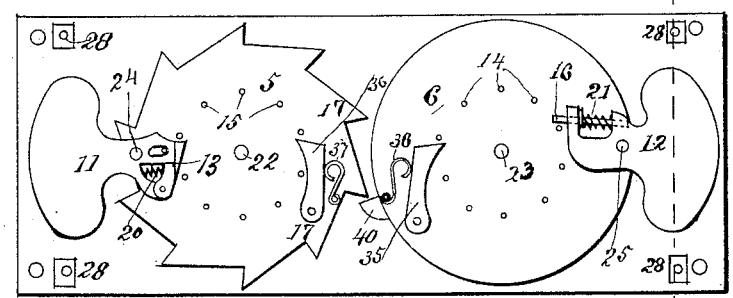
Fig. 3.
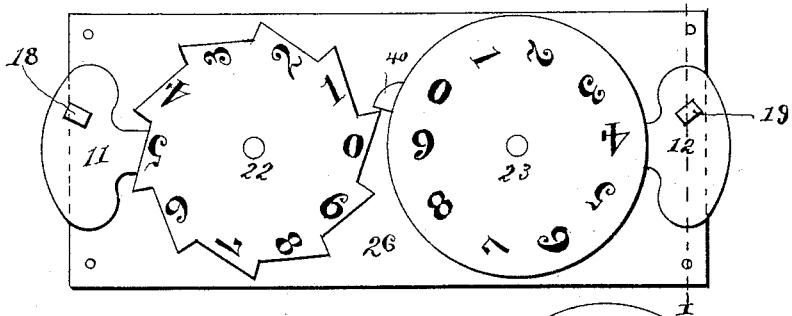
Fig. 2.
Fig. 4.
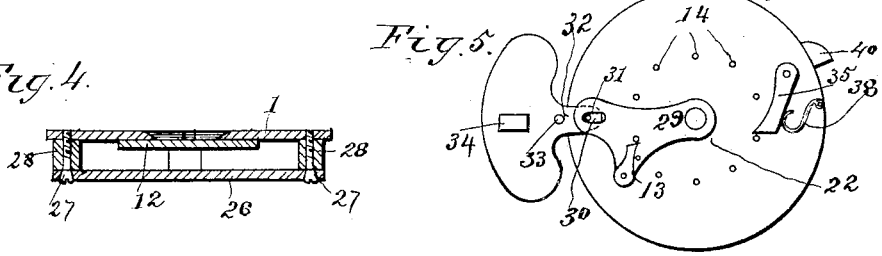
Fig. 5.
WITNESSES
INVENTOR
P. A. Eichler
By Floyd Wiegand
Attorney
THE NORRIS PETERS CO., PHOTO-LITHO., WASHINGTON, D. C.

UNITED STATES PATENT OFFICE.

PAUL A. EICHLER, OF PHILADELPHIA, PENNSYLVANIA.

REGISTER FOR BILLIARD-TABLES.

SPECIFICATION forming part of Letters Patent No. 456,693, dated July 28, 1891.

Application filed December 18, 1890. Serial No. 375,164. (No model.)

*To all whom it may concern:*

Be it known that I, PAUL A. EICHLER, a citizen of the United States, residing at Philadelphia, in the county of Philadelphia and State of Pennsylvania, have invented certain new and useful Improvements in Registers for Billiard-Tables; and I do hereby declare the following to be a sufficiently full, clear, and exact description thereof as to enable others skilled in the art to make and use the said invention.

This invention relates to registers for recording the progress of games, and is especially applicable to billiard-tables, and is constructed with reference to being inserted in the rim or upper frame of such tables outside of the elastic cushions.

The object of the invention is to furnish an easy means of recording and reading the progress and score of the game, which shall be constantly accessible to inspection, easily operated to make the record and as easily brought to the zero-mark for the commencement of a new counting.

To effect these results the nature of the invention consists of two rotating dials, each provided with a series of numeral-characters and a pawl-and-ratchet motion for propelling them one place or division at each operation, and an interlocking tooth upon one dial arranged to intermittently turn one dial through a single division for each entire rotation of the other. The whole device is made in a flat form adapted to be inserted with its upper face flush with the top of the table and present the figures for reading through the apertures in the top plate of the instrument and present buttons or knobs easily accessible to the fingers of the players to reciprocate the pawls, but at the same time not exposed to accidental contact with the cues of the players.

The construction and operation of this invention are hereinafter fully described, and shown in the accompanying drawings, in which—

Figure 1 shows a plan of the invention as applied to the upper frame of a billiard-table; Fig. 2 a plan thereof with the top plate removed; Fig. 3, an inverted plan with the bottom plate removed; Fig. 4, a vertical section in the plan indicated by the dotted line *x x* in Figs. 1, 2, and 3. Fig. 5 shows a modified form of the operating lever and pawl viewed from the under side.

1 represents the top plate, which when applied to a billiard-table is placed in a space cut in the upper outer frame, so as to be flush with the top surface of the frame, and is held in place by screws 2 2 2 2, with their heads flush with the plate. In the plate 1 are openings 3 and 4, through which, respectively, the figures upon the dial-plates 5 and 6 are visible. Near the ends of the plate 1 are curved slots 7 and 8, on the under side of which, respectively, are plates 9 and 10, forming parts of the levers 11 and 12, which actuate pawls 13 and 14, engaging in the pins 15 and 16, placed in circles on the under side of the dial-plates 5 and 6 and operating as ratchet-wheels for turning the dial-plates 5 and 6, respectively, one-tenth of a revolution each time the levers 11 and 12 and pawls 13 and 14 are reciprocated. Upon the outer rim of the dial-plate 5 there are formed ten equidistant teeth, (marked 17,) and on the dial-plate 6 at the point between the radii passing through the numeral characters 9 and 0 is a single tooth 40, which engages one of the teeth 17 in the dial-plate 5 and turns that dial-plate one-tenth of a revolution for each complete revolution of the dial-plate 6.

Upon each of the levers 9 and 10 are secured buttons marked, respectively, 18 and 19, the tops of which are flush with the upper surface of the plate 1 and reciprocated, as operated by the finger, in the curved slots 7 and 8. The edges of the slots 7 and 8 are beveled, so as to facilitate access to the buttons 18 and 19.

The pawl 13 (shown in Fig. 3) is pivotally attached to the lever 11 and pressed toward the pins 15 on the under side of the dial-plate 5 by a spring 20, and the pawl 16 is shown in the same figure as sliding on the lever 12 and pressed toward the pins 14 on the under side of the dial-plate 6 by the spring 21. Either form of pawl may be used; but that having pivotal connection with the lever is preferable, as more durable.

Pawls 35 and 36, pivoted to the back plate 26 and pressed by springs 37 and 38 against the pins 15 and 14, serve to prevent the dials 5 and 6 from turning backward.

The pivots 22 and 23 of the dial-plates 5 and 6 and also the pivots 24 and 25 of the levers 11 and 12 are fastened at their lower ends in the bottom or back plate 26, which is secured by screws 27, inserted through it into lugs 28, formed on the under side of the face or top plate 1.

In Fig. 5 is shown a modification of the levers bearing pawls. In this case the lever 29, with the pawl 13, has a fulcrum on the pivot 22 of the dial 5 and has a slot 30, formed in it into which a pin 31 on the lever 32 works, said lever turning on a fulcrum 33, and is provided with a button 34, to be worked in the same manner as the lever 11 by the button 18.

The plates of the levers 11 and 12 should be of such size as to cover the slots 7 and 8 in all positions.

The thickness of the several parts should be, as shown in Fig. 4, such that the back plate being screwed to place will hold them in position with the dial-plates 5 and 6, so as to turn freely under the plate 1.

The dials 5 and 6 being set at "0," to operate this invention for each unit to be recorded the button 19 and connected lever 10 and pawl 14 are reciprocated once, turning the dial-plate 6 one division. When this operation has been ten times repeated, the single tooth 40 is brought into contact with one of the teeth 17 on the dial-plate 5, and upon the next reciprocation of the button 19, lever 10, and pawl 14 the "0" appears in the dial 6 and the "0" in the dial 5 disapears and the "1" appears in its place.

When it is desired to add ten to the score at a single operation, the button 18 and lever 11 are operated in like manner, and when it is required to bring both dials to "0" each of the levers 11 and 12 is reciprocated until the "0 0" appear in the openings 3 and 4.

Having described my invention and the operation thereof, what I claim is—

In a billiard-table register, the parallel plates arranged to form the top and bottom of the register, said plates being constructed so as to confine between them the rotating dials, an actuating-ratchet having a single actuating-tooth, the pawls and the actuating-levers, the said top plate having slots, and the actuating-levers arranged to work beneath the slots, in combination with the pivotally-connected buttons reciprocating within said slots flush with the top plate and arranged to display the figures of the dials successively through the top plate and to permit the independent adjustment of each dial, substantially as set forth.

PAUL A. EICHLER.

Witnesses:
A. VAN WYCK BUDD,
J. DANIEL EBY.